United States Patent [19]

Sekine

[11] Patent Number: 4,579,140
[45] Date of Patent: Apr. 1, 1986

[54] AIR RELIEF DEVICE FOR LIQUID FLOW PIPE

[75] Inventor: Shigeaki Sekine, Shirone, Japan

[73] Assignee: Meiwa Industrial Co., Ltd., Shirone, Japan

[21] Appl. No.: 722,212

[22] Filed: Apr. 11, 1985

[30] Foreign Application Priority Data

Feb. 14, 1985 [JP] Japan ................ 60-20360[U]

[51] Int. Cl.[4] .......................................... F16K 24/00
[52] U.S. Cl. ............................... 137/202; 137/433;
  137/614.17; 137/390
[58] Field of Search ............... 137/202, 614.17, 433,
  137/183

[56] References Cited
U.S. PATENT DOCUMENTS 3,790,306  2/1974  Uefuji .................. 137/202 X

FOREIGN PATENT DOCUMENTS 2429304  1/1975  Fed. Rep. of Germany ...... 137/202
 115672  9/1980  Japan ............................. 137/202
  17266  2/1983  Japan ............................. 137/202
   1882  1/1984  Japan ............................. 137/202

Primary Examiner—Alan Cohan
Attorney, Agent, or Firm—Wenderoth, Lind & Ponack

[57] ABSTRACT

An air relief device for use in a liquid flow pipe comprises an outer housing fixed to a large-diameter air outlet formed in a portion of the pipe arranged at an elevation, an inner housing rotatably fitted snugly in the outer housing, a float accommodated in the inner housing, and a lid member having a valve port and adapted to be put on the inner housing. The outer and inner housings have through holes bored therein respectively and allowed to coincide exactly with each other. Fluid communication or severance of the fluid communication between the pipe and the inner housing can be obtained by rotating the inner housing to vary the relation in position between the through holes in the outer and inner housings.

8 Claims, 4 Drawing Figures

AIR RELIEF DEVICE FOR LIQUID FLOW PIPE

BACKGROUND OF THE INVENTION

1. Field of the Invention

The present invention relates to an air relief device disposed in any of various kinds of liquid flow pipes such as supply pipes for cooling water and liquid material in plant equipment, water mains, etc.

2. Description of the Prior Art

The air present in a liquid flow pipe is one of the largest factors of obstructing the flow of liquid. For this reason, an air relief device utilizing a float valve mechanism is generally disposed in the liquid flow pipe, particularly in a portion of the liquid flow pipe arranged at an elevation.

When the flow pipe is exhausted of air by utilizing the float valve mechanism, however, since suspended matter, such as dust etc., contained in the liquid flows together with the air into the valve casing of the float valve mechanism, it is necessary to clean the interior of the valve casing. Further, this cleaning work must be carried out in a state wherein the fluid communication between the valve casing and the flow pipe is cut off.

For this reason, a prior art air relief device comprises a valve casing having a float valve mechanism arranged therein and a switch valve interposed between the valve casing and a flow pipe, and has a construction such that fluid communication between the flow pipe and the valve casing is cut off by the switch valve when the valve casing is to be cleaned.

However, the construction having the switch valve interposed between the valve casing and the flow pipe causes the valve casing to project for nothing upwardly from the flow pipe and, due to the smaller size of the switch valve as compared with that of the valve casing, to project upward in a considerably ill-balanced state, i.e. in a top-heavy state. Therefore, the prior art air relief device per se is set in position in a state of being liable to be damaged or broken down by an impact etc.

Since the valve casing of the prior art air relief device is far from the flow pipe due to the interposition of the switch valve therebetween and since the liquid stays within the valve casing, particularly when the air relief device is used in a cold district, the staying liquid is liable to be frozen. For example, there is a case where a heat insulation cover is required to be attached to the valve casing in order to avoid freezing of the staying liquid. However, since the prior art air relief device is protruded in an ill-balanced state, the heat insulation cover becomes complicated in shape and is cumbersome to attach.

OBJECT AND SUMMARY OF THE INVENTION

The main object of the present invention is to provide an air relief device capable of precisely cutting itself off from fluid communication with a liquid flow pipe easily without using any switch valve when cleaning is to be effected, and being set in position so as not to project upwardly for nothing as in the conventional air relief device.

Another object of the present invention is to provide an air relief device capable of sufficiently enduring long use in a cold district.

To attain the objects described above according to the present invention, there is provided an air relief device comprising an outer housing fixed to a large-diameter air outlet formed in a portion of a liquid flow pipe arranged at an elevation, an inner housing rotatably fitted snugly in the outer housing and having a float arranged in the interior thereof, and a lid member for use on the inner housing and having a valve port, the outer housing and the inner housing having a plurality of corresponding through holes bored therein, whereby fluid communication or severance of the fluid communication between the inner housing and the flow pipe can be obtained by rotating the inner housing to vary the relation in position between the through holes of the outer and inner housings.

The aforementioned and other objects, advantages and characteristic features of the present invention will become apparent to those skilled in the art as the disclosure is made in the following description of a preferred embodiment of the invention, as illustrated in the accompanying drawings.

DETAILED DESCRIPTION OF THE PREFERRED EMBODIMENT

Figure 1:
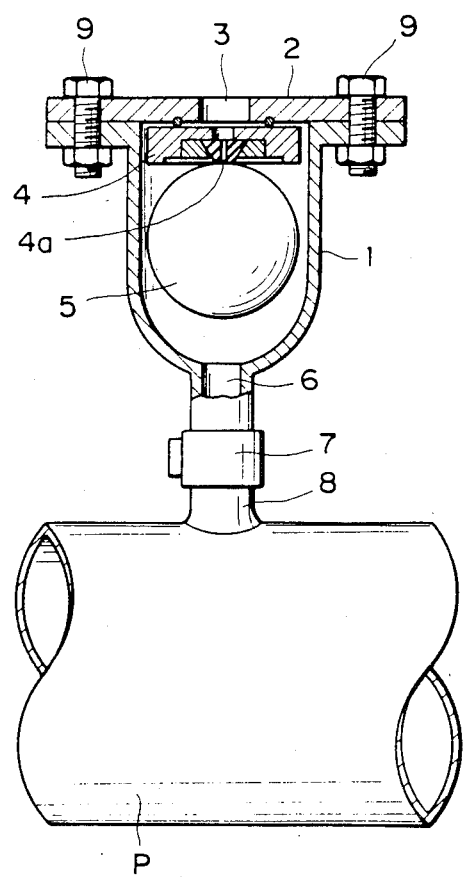
FIG. 1 is a cross-sectional view illustrating a prior art air relief device as being attached to a water main.

FIG. 1 shows a conventional air relief device disposed of a water main P. The conventional air relief device comprises a valve casing 1, a lid member 2 provided therein with a valve port 3 and fixed to the upper portion of the valve casing 1 by means of combinations bolts and nuts 9, a disklike upper float 4 and a spherical lower float 5 both disposed within the valve casing 1, and a switch valve 7 connected to the lower port 6 of the valve casing 1. The switch valve 7 is connected to a portion of the water main P arranged at an elevation by means of a small-diameter joint member 8.

Under normal conditions, the switch valve 7 is set open to form fluid communication between the water main P and the valve casing 1. Therefore, hydraulic pressure causes the upper float 4 to stop up the valve port 3 in the lid member 2 and the spherical lower float 5 to stop up an exhaust passage 4a formed in the upper float 4. In this state, when the air within the water main P ascends into the valve casing 1 through the switch valve 7 and the lower port 6, the spherical lower float 5 alone or both the lower float 5 and the disklike upper float 4 are pushed downwardly depending upon the amount of the ascending current of air to open the exhaust passage 4a in the upper float 4 or the valve port 3 in the lid member 2, with the result that the air is discharged out of the air relief device via the valve port 3. After the air has been discharged, the floats 4 and 5 are allowed to ascend again by the action of buoyancy to stop up the valve port 3 in the lid member 2.

In case where it is desired to clean the interior of the valve casing 1, the switch valve 7 is set closed to cut off the fluid communication between the water main P and the valve casing 1 and then the lid member 2 is unfixed from the valve casing 1. As a result, it is possible to clean the floats 4 and 5 and the interior of the valve casing 1.

With the prior art air relief device, therefore, since the switch valve 7 interposed between the water main P and the valve casing 1 completely prevents the water from flowing into the valve casing, the interior of the valve casing 1 can be cleaned with ease. However, since the valve casing 1 projects for nothing upwardly from the water main P in a considerably ill-balanced state, i.e. in a top-heavy state, due to the size of the switch valve 7 smaller than that of the valve casing 1, the conventional air relief device per se is set in position in a state of being susceptible to be damaged or broken down by an externl impact etc. Further, since the valve casing 1 is far from the water main P because of the interposition of the switch valve 7 and since water stays within the valve casing 1, the conventional air relief device, when used in a cold district, has a disadvantage in that the staying water is liable to be frozen. In order to avoid freezing of the staying water, a heat insulation cover is required to be attached to the valve casing 1. However, since the valve casing 1 is projected in an ill-balanced state, as described above, the heat insulation cover becomes complicated in shape and is troublesome to attach. Furthermore, since the switch valve 7 is connected to the water main P through the small-diameter joint member 8, the conventional air relief device has often undergone impossibility of the air in the water main P being discharged at one time.

Figure 2:
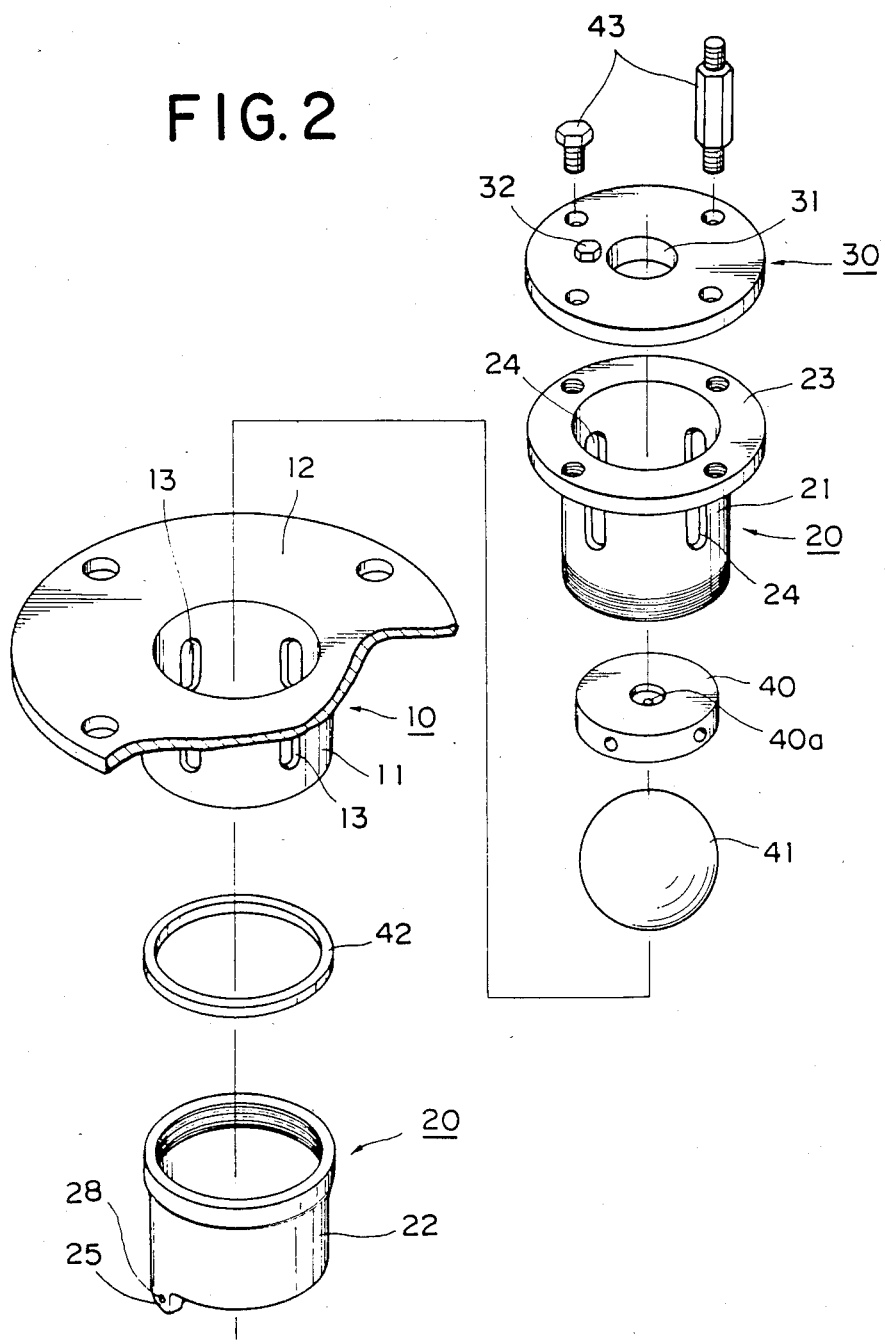
FIG. 2 is an exploded perspective view illustrating one embodiment of the air relief device according to the present invention.
Figure 3:
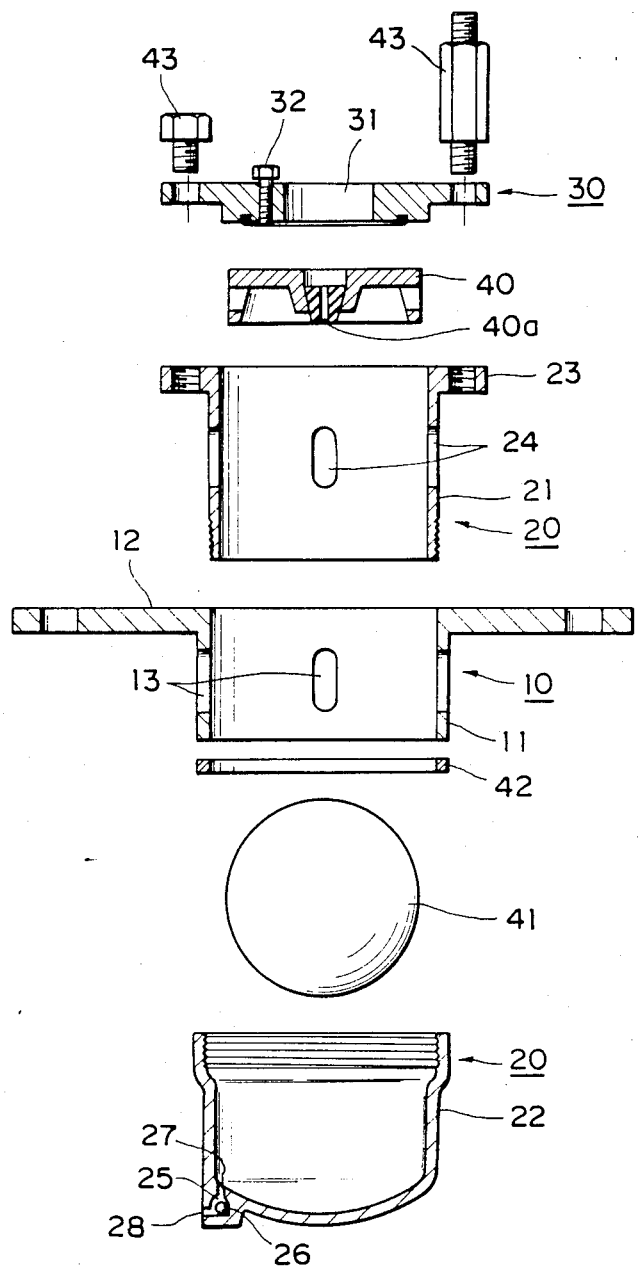
FIG. 3 is an exploded cross-sectional view of the same embodiment.
Figure 4:
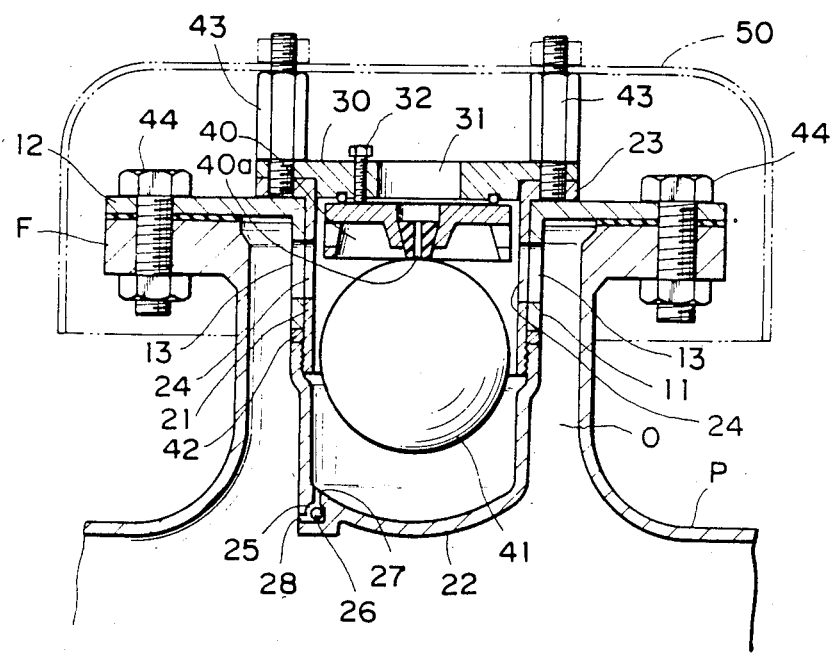
FIG. 4 is a cross-sectional view illustrating the state wherein the air relief device according to the present invention has been attached to the air outlet of a water main.

The present invention has been accomplished in order to eliminate the aforementioned drawbacks suffered by the conventional air relief device and will now be described in detail with reference to FIGS. 2 to 4 showing one embodiment of the air relief device according to the present invention which is applied to a water main.

FIG. 2 is an exploded perspective view illustrating the air relief device of the present invention. FIG. 3 is an exploded cross section of the same. The air relief device of the present invention comprises an outer housing 10 fixed to a large-diameter air outlet O formed, as shown in FIG. 4, in a portion of a water main P arranged at an elevation, an inner housing 20 tightly fitted in the outer housing 10 and provided therein with a disklike upper float 40 and a spherical lower float 41, and a lid member 30 having a valve port 31 formed in the center thereof and adapted for use on the inner housing 20.

The outer housing 10 is composed of a bottomless barrel portion 11 having a plurality of through holes 13 formed equidistantly therein for admitting water and air and an annular flange portion 12 integrally formed on the upper end of the barrel portion 11.

The inner housing 20 is composed of an upper barrel portion 21 having an annular flange 23 formed on the upper end thereof and a bottomed lower barrel portion 22 having the upper end thereof screw-fitted to the lower end of the upper barrel portion 21. The upper barrel portion 21 has a plurality of through holes 24 formed therein so as to correspond to and coincide exactly with the through holes 13 formed in the barrel portion 11 of the outer housing 10. The lower barrel portion 22 is provided in the lower portion thereof at a suitable position with a compartment 25 which accommodates therein a ball 26 and has water passageways 27 and 28 communicating respectively with the inside and outside of the lower barrel portion 22 for admitting and discharging the water.

The lid member 30 has an operation bolt 32 screwed thereinto in the vicinity of the valve port 31 so as to be capable of projecting from the lower surface of the lid member 30.

The outer housing 10, inner housing 20 and lid member 30 are assembled into the air relief device of the present invention by tightly fitting the upper barrel portion 21 of the inner housing 20 into the outer housing 10, screw-fitting the lower end of the upper barrel portion 21 projecting from the lower end of the outer housing 10 into the upper end of the lower barrel portion 22 of the inner housing 20 so that the inner housing 20 is rotatably fitted in the outer housing 10 with the upper end of the lower barrel portion 22 serving as means for preventing the inner housing 20 from upwardly coming off the outer housing 10, setting the aforementioned floats 40 and 41 in position within the inner housing 20, and fixing the lid member 30 to the annular flange 23 of the inner housing 20 with at least two bolts 43. In order to obtain smooth rotation of the inner housing 20 relative to the outer housing 10, it is preferable to attach between the lower end face of the outer housing 10 and the upper end face of the lower barrel portion 22 a metallic ring 42 exhibiting a sliding effect and a rust-proof property.

The air relief device of the present invention is attached to the water main P, as illustrated in FIG. 4, by fixing the flange portion 12 of the outer housing 10 to a flange portion F formed at the air outlet O of the water main P with combinations bolts and nuts 44 and consequently the inner housing 20 and the other housing 10 are set in position within the air outlet O.

Under normal conditions in use, the inner housing 20 is rotated to set the through holes 24 in the inner housing 20 coincident with the through holes 13 in the outer housing 10, thereby allowing the inner housing 20 and the water main P to communicate with each other. In this state, hydraulic pressure causes the spherical lower float 41 to stop up an exhaust passage 40a formed in the upper float 40 and the upper float 40 to stop up the valve port 31 formed in the lid member 30.

When the air in the water main P ascends and flows into the inner housing 20 through the through holes 13 and 24 in the aforementioned state, the spherical lower float 41 alone or both the lower float 41 and the disklike upper float 40 are pushed downwardly depending on the amount of the ascending current of air to open the exhaust passage 40a in the upper float 40 or the valve port 31 in the lid member 30, with the result that the air is discharged out of the air relief device via the valve port 31. After the air has been discharged, the floats 40 and 41 are allowed to ascend again to their respective stopping-up positions by the action of buoyancy.

When the floats are pushed downwardly by the entrance of air, the water in the inner housing 20 is discharged through the water passageways 27 and 28 in the compartment 25 into the water main P. After the air has been discharged out of the air relief device, the water in the water main P flows into the inner housing 20 through the water passageways 28 and 27. Thus, the compartment 25 having the water passageways 27 and 28 functions to immediately move the floats up and down.

When it is necessary to clean the interior of the inner housing 20, the inner housing 20 is rotated until the through holes 13 in the outer housing 10 are stopped up by the outer wall surface of the upper barrel portion 21. As a result, the fluid communication between the inner housing 20 and the water main P is immediately cut off. Therefore, by detaching the lid member 30 from the inner housing 20, cleaning work can effectively be carried out similarly to the case of the convnetional air relief device. Further, in the state of severing the fluid communication, since the ball 26 in the compartment 25 stops up the water passageway 27 by the hydraulic pressure applied from the water passageway 28, there is no fear of the water flowing into the inner housing 20 through the compartment 25.

Even after the fluid communication between the water main P and the inner housing 20 has been cut off by the rotation of the inner housing 20, the upper and lower floats 40 and 41 are still pushed against the lid member 30 and tightly stop up the valve port 31 in the lid member 30 by the action of the internal hydraulic pressure within the inner housing 20. Therefore, the operation bolt 32 is driven downwardly to project from the lower surface of the lid member 30 and collide against the upper float 40 and is further driven downwardly to force the upper float 40 to be inclined or pushed down. As a result, the internal pressure and exterior pressure become equal to each other and, therefore, the lid member 30 can easily be detached from the inner housing 20.

Further, there are provided at least two bolts 43 for fixing the lid member 30 to the flange 23 of the inner housing 20 to project upwardly as shown in FIG. 4. In rotating the inner housing 20, a rod or the like member is bridged between the bolts 43 and rotated, thereby making it easy to rotate the inner housing 20 relative to the outer housing 10. A protective cover 50 may be attached by utilization of the bolts 43.

In the embodiment described above, the disklike and spherical floats 40 and 41 have been disposed within the inner housing 20. Optionally, however, a spherical float alone may be used depending on the working conditions.

As described above, the present invention is characterized in that a combination of the outer housing having a plurality of through holes bored therein and the inner housing provided therein with corresponding through holes and rotatably fitted snugly in the outer housing is used in place of the valve casing of the conventional air relief device, that fluid communication between the liquid flow pipe and the inner housing having a float accommodated therein is easily obtained by rotating the inner housing relative to the outer housing so that the corresponding through holes may coincide with each other and is completely cut off by rotating the inner housing relative to the outer housing so that the through holes in the inner housing may be stopped up by the inner wall surface of the outer housing, and consequently that there is no need to use a switch valve which has heretofore caused the conventional valve casing to project upwardly for nothing.

According to the present invention, since the outer housing having the inner housing rotatably fitted snugly therein can be set in position as completely accommodated within the air outlet of the liquid flow pipe, the device per se does not project upwardly for nothing in a top-heavy state from the flow pipe and, therefore, there is no need to worry about damage or breakdown of the device due to an impact etc.

Even though the liquid staying in the vicinity of the air outlet of the flow pipe is cooled by the open air, since the staying liquid and the liquid flowing within the flow pipe run together, the staying liquid in the inner housing can be prevented as much as possible from being frozen. Therefore, no problem with arise when the air relief device of the present invention is used in a cold district and there is no need to subject the device to heat insulation treatment.

Furthermore, since the air outlet of the flow pipe has a large diameter, the air bubbles flowing together with the liquid within the pipe can efficiently be discharged to the open air.

What is claimed is:

1. An air relief device for a liquid flow pipe, comprising:
   an outer housing provided therein with a plurality of through holes and fixed to a large-diameter air outlet in a portion of the liquid flow pipe which is arranged at an elevation,
   an inner housing provided therein with a plurality of through holes corresponding to said plurality of through holes in said outer housing, rotatably fitted snugly in said outer housing,
   a float accommodated within said inner housing, and
   a lid member having a valve port bored therein and adapted to be put on the upper surface of said inner housing,
   whereby fluid communication between the liquid flow pipe and said inner housing is obtained by rotating said inner housing until said plurality of through holes in said inner housing coincide with said plurality of through holes in said outer housing and is cut off by rotating said inner housing until said plurality of through holes in said inner housing are stopped up by the inner wall surface of said outer housing.

2. An air relief device according to claim 1, wherein said outer housing is composed of a barrel portion and a flange portion formed on the upper end of said barrel portion and said plurality of through holes are formed in said barrel portion, said inner housing is composed of an upper barrel portion an a bottomed lower barrel portion screw-fitted relative to said inner barrel portion and said plurality of through holes are formed in said upper barrel portion, and said flange portion of said outer housing is fixed to the large-diameter air outlet in the liquid flow pipe in a state wherein said barrel portion of said outer housing and said inner housing are accommodated within said large-diameter air outlet.

3. An air relief device according to claim 1, wherein said inner housing is provided therein at a suitable position with a compartment which has a ball accommodated therein and water passageways formed therein so as to communicate with the inside and the outside of said inner housing.

4. An air relief device according to claim 2, wherein said inner housing is provided therein at a suitable position with a compartment which has a ball accommodated therein and water passageways formed therein so as to communicate with the inside and the outside of said inner housing.

5. An air relief device according to claim 1, wherein said lid member has an operation bolt screwed thereinto in the vicinity of said valve port so as to be capable of projecting from the lower surface of said lid member.

6. An air relief device according to claim 2, wherein said lid member has an operation bolt screwed thereinto in the vicinity of said valve port so as to be capable of projecting from the lower surface of said lid member.

7. An air relief device according to claim 3, wherein said lid member has an operation bolt screwed thereinto in the vicinity of said valve port so as to be capable of projecting from the lower surface of said lid member.

8. An air relief device according to claim 4, wherein said lid member has an operation bolt screwed thereinto in the vicinity of said valve port so as to be capable of projecting from the lower surface of said lid member.

* * * * *